US007566087B2

(12) United States Patent
Hanna et al.

(10) Patent No.: US 7,566,087 B2
(45) Date of Patent: Jul. 28, 2009

(54) POWER CLOSURE ASSEMBLY

(75) Inventors: Ronald J. Hanna, Mancelona, MI (US); James R. Deplonty, Bellaire, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 11/831,199

(22) Filed: Jul. 31, 2007

(65) Prior Publication Data

US 2008/0042465 A1 Feb. 21, 2008

Related U.S. Application Data

(60) Provisional application No. 60/822,782, filed on Aug. 18, 2006.

(51) Int. Cl.
*B62D 25/10* (2006.01)

(52) U.S. Cl. .................... 296/76; 296/146.8; 296/146.4

(58) Field of Classification Search .................. 296/76, 296/56, 146.8, 107.08, 146.11
See application file for complete search history.

(56) References Cited

U.S. PATENT DOCUMENTS

| | | | | |
|---|---|---|---|---|
| 3,343,303 | A * | 9/1967 | Wanlass | 296/76 |
| 4,580,315 | A * | 4/1986 | Beckwith | 16/308 |
| 4,813,303 | A * | 3/1989 | Beezer et al. | 74/425 |
| 5,062,182 | A * | 11/1991 | Griffiths et al. | 16/368 |
| 5,195,796 | A * | 3/1993 | Wampler, II | 296/76 |
| 5,235,725 | A * | 8/1993 | Rees | 16/298 |
| 5,595,025 | A * | 1/1997 | MacPhail-Fausey | 49/351 |
| 5,758,389 | A * | 6/1998 | Wolda | 16/308 |
| 5,896,703 | A * | 4/1999 | Wright et al. | 296/56 |
| RE36,267 | E * | 8/1999 | Moore et al. | 49/340 |
| 6,100,655 | A * | 8/2000 | McIntosh | 318/159 |
| 6,142,551 | A * | 11/2000 | Ciavaglia et al. | 296/56 |
| 6,283,535 | B1 * | 9/2001 | Yuge | 296/146.8 |
| 6,309,005 | B1 * | 10/2001 | Priest et al. | 296/100.06 |
| 6,352,298 | B1 | 3/2002 | Hayashi et al. | |
| 6,367,199 | B2 * | 4/2002 | Sedlak et al. | 296/56 |
| 6,382,706 | B2 * | 5/2002 | Yuge et al. | 296/146.4 |
| 6,478,357 | B2 * | 11/2002 | Zhou | 296/56 |
| 6,513,859 | B2 * | 2/2003 | Yuge | 296/146.4 |
| 6,520,557 | B2 | 2/2003 | Benthaus et al. | |
| 6,550,839 | B2 * | 4/2003 | Rogers et al. | 296/56 |
| 6,601,903 | B2 * | 8/2003 | Nakagome | 296/76 |
| 6,776,443 | B2 * | 8/2004 | Shimura et al. | 296/56 |
| 6,789,834 | B2 | 9/2004 | Schlegel | |
| 6,814,392 | B1 * | 11/2004 | Tomaszewski | 296/146.4 |
| 6,929,310 | B2 * | 8/2005 | Okada | 296/146.8 |
| 6,955,390 | B2 * | 10/2005 | Rigorth et al. | 296/146.4 |
| 6,964,449 | B2 * | 11/2005 | Takeda et al. | 296/146.4 |
| 7,014,248 | B2 * | 3/2006 | Yokota et al. | 296/146.4 |
| 7,021,003 | B2 * | 4/2006 | Daniels et al. | 296/56 |
| 7,059,653 | B2 * | 6/2006 | Oberheide | 296/146.1 |
| 7,063,373 | B2 * | 6/2006 | Chikata et al. | 296/146.4 |

(Continued)

*Primary Examiner*—Kiran B. Patel
(74) *Attorney, Agent, or Firm*—Gifford, Krass, Sprinkle, Anderson & Citkowski, P.C.; Kevin S. MacKenzie; Dean B. Watson

(57) ABSTRACT

A powered trunk closure assembly for a vehicle includes a linkage assembly attached at one end to a body bracket and at another end to a closure member bracket. A motor is linked with a gear train for actuating the linkage assembly. The motor and gear train are positioned exterior of the trunk.

15 Claims, 5 Drawing Sheets

U.S. PATENT DOCUMENTS

| | | | | |
|---|---|---|---|---|
| 7,069,695 | B2 * | 7/2006 | Hattori et al. | 296/56 |
| 7,093,877 | B2 * | 8/2006 | Duffy | 296/76 |
| 7,104,589 | B2 * | 9/2006 | Takeda et al. | 296/146.8 |
| 7,137,174 | B2 * | 11/2006 | Derbis et al. | 16/289 |
| 7,140,150 | B2 * | 11/2006 | Sakai et al. | 296/56 |
| 7,144,065 | B2 * | 12/2006 | McClure et al. | 296/146.8 |
| 7,156,447 | B2 * | 1/2007 | Watanabe | 296/146.4 |
| 7,175,228 | B2 * | 2/2007 | Mrkovic et al. | 296/155 |
| 7,201,430 | B2 * | 4/2007 | Sakai et al. | 296/146.8 |
| 7,293,819 | B2 * | 11/2007 | Duffy | 296/76 |
| 7,314,243 | B2 * | 1/2008 | Okada et al. | 296/76 |
| 7,355,365 | B2 * | 4/2008 | Platzkoester | 296/76 |
| 7,370,905 | B2 * | 5/2008 | Watanabe | 296/146.4 |
| 7,429,073 | B2 * | 9/2008 | Watanabe et al. | 296/146.4 |
| 2002/0180233 | A1 * | 12/2002 | Benthaus et al. | 296/76 |
| 2003/0038500 | A1 * | 2/2003 | Aubry et al. | 296/76 |
| 2004/0112180 | A1 * | 6/2004 | Day | 81/57.28 |
| 2004/0124662 | A1 * | 7/2004 | Cleland et al. | 296/146.4 |
| 2005/0001444 | A1 * | 1/2005 | Sakai et al. | 296/56 |
| 2005/0057067 | A1 * | 3/2005 | Fukumoto et al. | 296/76 |
| 2005/0168010 | A1 * | 8/2005 | Cleland et al. | 296/146.8 |
| 2005/0173943 | A1 | 8/2005 | Duffy | |
| 2006/0071505 | A1 * | 4/2006 | Ciavaglia et al. | 296/146.11 |
| 2006/0232090 | A1 * | 10/2006 | Duffy | 296/76 |
| 2007/0261306 | A1 * | 11/2007 | Hanna et al. | 49/52 |
| 2008/0042465 | A1 * | 2/2008 | Hanna et al. | 296/76 |

* cited by examiner

POWER CLOSURE ASSEMBLY

FIELD OF THE INVENTION

The invention relates to power closure devices.

BACKGROUND OF THE INVENTION

Various power closure devices are known in the art. Examples include powered doors and sliders, hoods, lift gates, tailgates, and deck lids. Power operation of a variety of closures of a vehicle provides for a hands-free operation of the closure members and provides a convenient method for opening and closing closures. In today's vehicle market, there is a demand for increased convenience on various aspects of the vehicle. Vehicle manufacturers as a result have sought to include such convenient features in a variety of vehicles.

There is therefore a need in the art for a power trunk closure assembly that may be easily installed by a vehicle manufacturer and is relatively compact and efficient and fits within a desired packaging space. Additionally, there is a need in the art for a power trunk closure assembly that is weather resistant, and has an improved power density compared to current prior art designs.

SUMMARY OF THE INVENTION(S)

Disclosed herein is a power trunk closure assembly for a vehicle includes at least one body panel that defines an opening of a trunk. The at least one body panel includes a water trough formed thereon. A closure member is positioned about the opening and is movable between open and closed positions relative to the opening. A linkage assembly is attached at one end to the body panel and at another end to the closure member. A motor is linked with a gear train that is attached to a pivot of the linkage assembly. The motor and gear train are disposed within the water trough formed in the body panel.

Disclosed herein is also a power trunk closure assembly for a vehicle includes a four bar linkage attached at one end to a body bracket and at another end to a closure member bracket. A motor is linked with a planetary gear train that is attached to a pivot of the four bar linkage. The planetary gear train has an output gear ratio of at least 750 to 1.

Disclosed herein is also, a power trunk closure assembly for a vehicle includes a linkage assembly that is attached at one end to a body panel bracket and at another end to a closure member bracket. A motor is linked with a planetary gear train that is attached to a pivot of the linkage assembly. The motor and gear train are attached at the pivot exterior of a trunk.

DETAILED DESCRIPTION OF THE PREFERRED EMBODIMENTS

Figure 1:
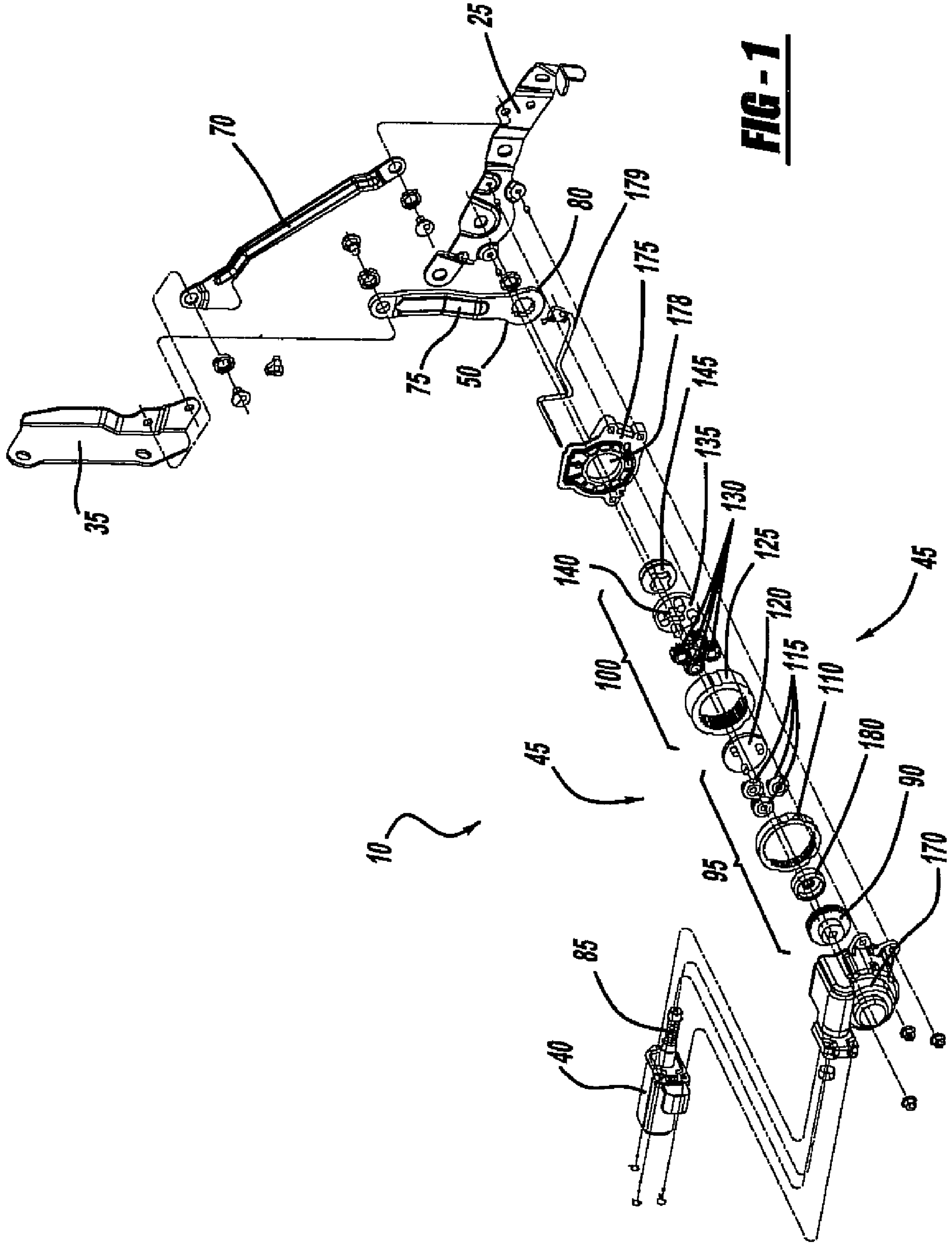
FIG. 1 is an exploded perspective view of a power trunk closure assembly.
Figure 3:
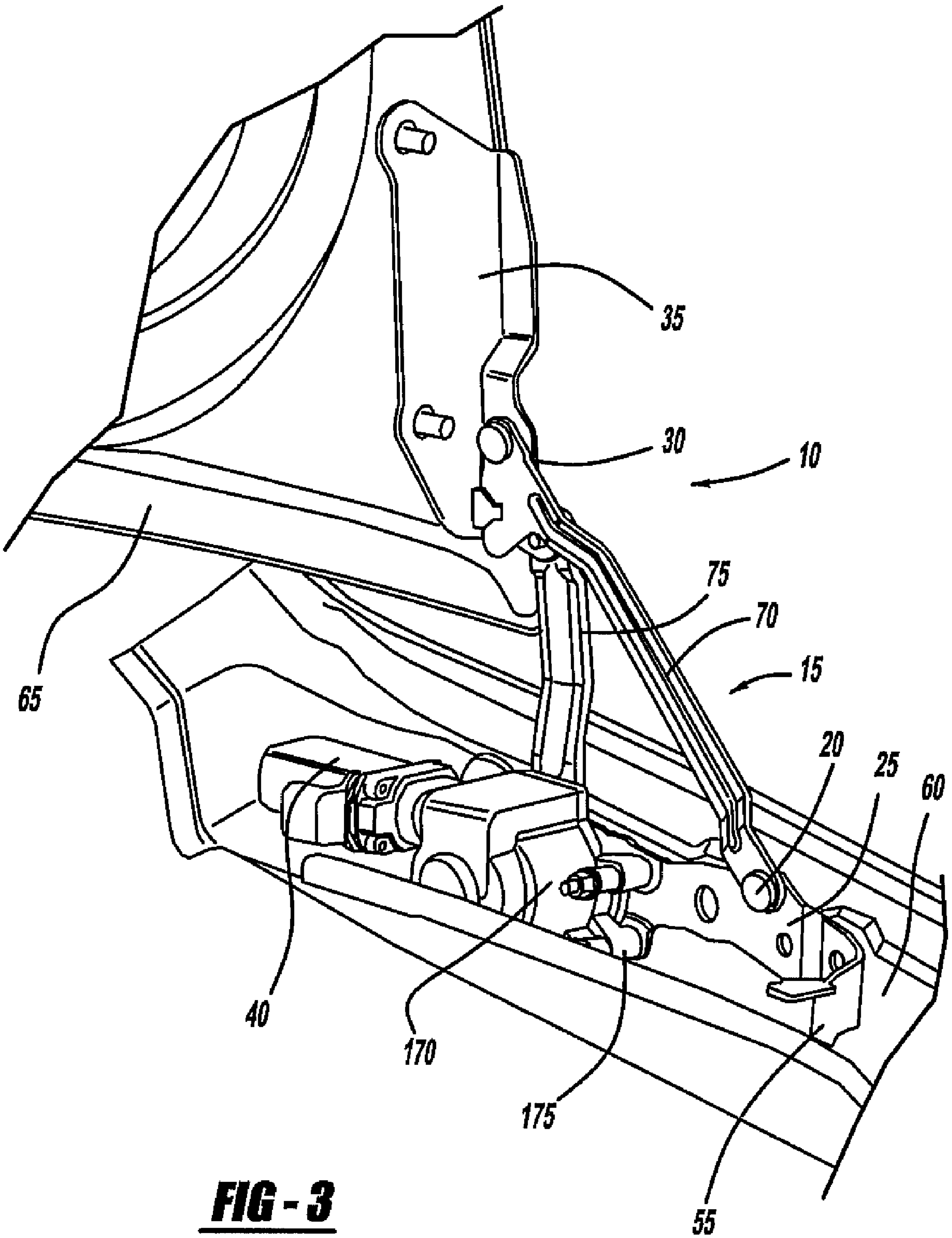
FIG. 3 is a perspective view of the power trunk closure assembly disposed in a trough of a body panel and attached to a closure member with the closure member in an open position.
Figure 4:
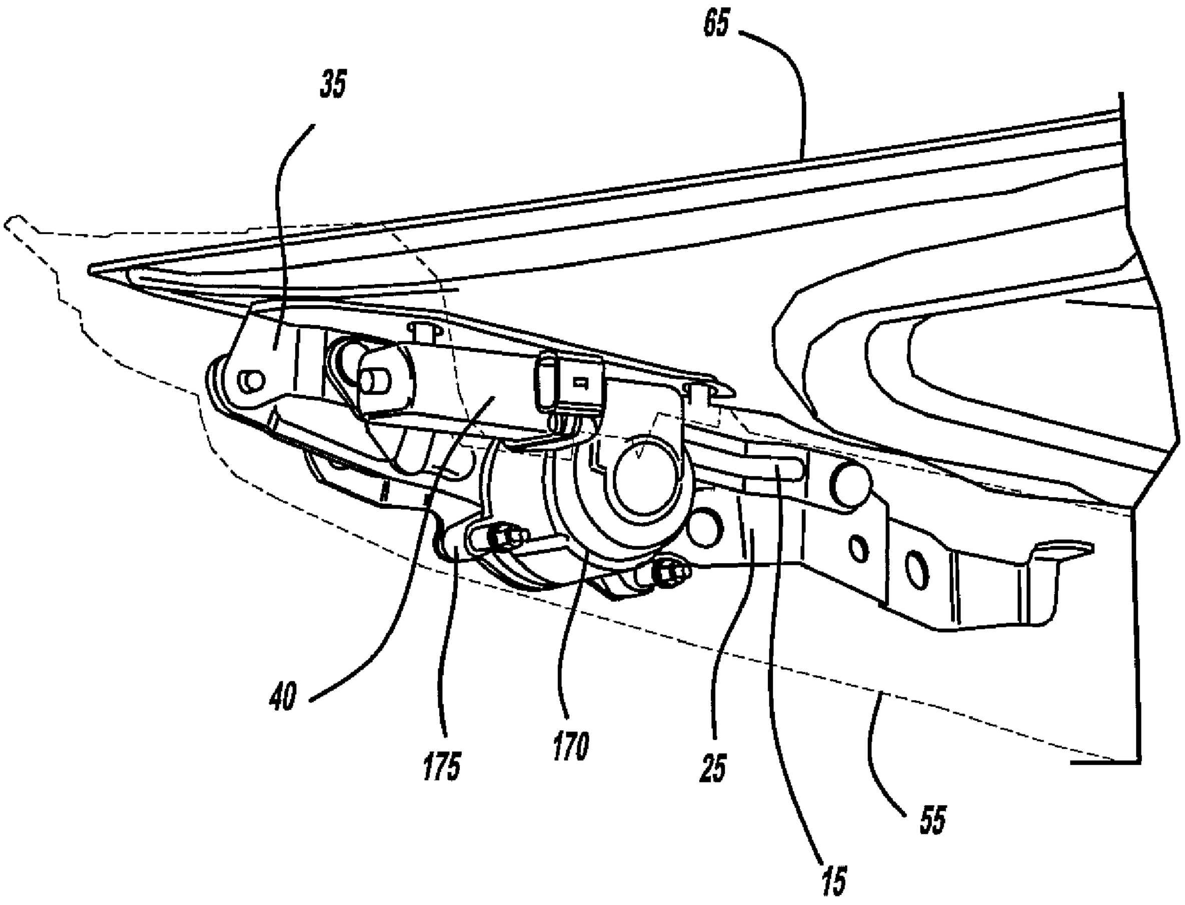
FIG. 4 is a perspective view of a power trunk closure assembly disposed in a trough shown in phantom and attached to a closure member with the closure member in the closed position.

Referring to FIG. 1, there is shown one embodiment of a power trunk closure assembly 10 for a vehicle. The power trunk closure assembly 10 includes a linkage assembly 15 attached at one end 20 to a body bracket 25 and at another end 30 to a closure member bracket 35. The terms trunk closure and closure member may encompass various trunk arrangements such as those using deck lids, lift gates and tonneaus. A motor 40 is linked with a gear train 45 that is attached to a pivot 50 of the linkage assembly 15. The term linked as used herein may include direct connection or may include other structure connected between the motor 40 and gear train 45, such as flex shafts, drives or other structure. In one aspect, the linkage assembly 15 is preferably a four bar linkage as shown in FIG. 1. It should be understood that alternative linkage assemblies may be used by the present invention. Examples of alternate linkage assemblies include goose neck linkages, six bar linkages and other multiple pivot hinges. The body bracket 25 is adapted to attach to a body panel 55 that includes a water trough 60, as best seen in FIGS. 3 and 4. Similarly, the closure member bracket 35 is adapted to attach to a closure member 65, again as best shown in FIGS. 3 and 4. In one aspect, the gear train 45 is disposed in the water trough 60.

As stated above, the motor 40 is linked with a gear train 45 and may be attached at a pivot 50 parallel to the linkage assembly 15. This arrangement allows the power trunk closure assembly 10 to remain relatively compact. The linkage assembly 15 may be a four bar linkage including a long link 70 and a short link 75. The long and short links 70, 75 are pivotably attached to the body panel bracket 25 and closure member bracket 35. In one aspect, the long and short links 70, 75 are pivotally connected to the brackets 25, 35 using rivets and bushings, although alternate attachment mechanism may be used allowing pivotal movement.

In one aspect of the invention, the motor 40 linked with the gear train 45 is attached to the short link 75 at the body panel end 80 of the short link 75. Such an attachment to the short link 75 requires less torque for driving the linkage assembly 15 compared to attaching the motor 40 and drive train 45 on the long link 70. However, the motor 40 and gear train 45 may be attached to the long link 70 should design and packaging requirements facilitate such an attachment.

In one aspect of the invention and as shown in FIG. 1, the gear train 45 may be a planetary gear train. In the depicted embodiment, the motor 40 is attached to a worm drive 85 that engages a sun gear 90 of the planetary transmission. The depicted planetary transmission includes first and second reduction stages 95, 100. However, the transmission may have a single planetary reduction or have multiple planetary reductions as the design requires.

Figure 2:
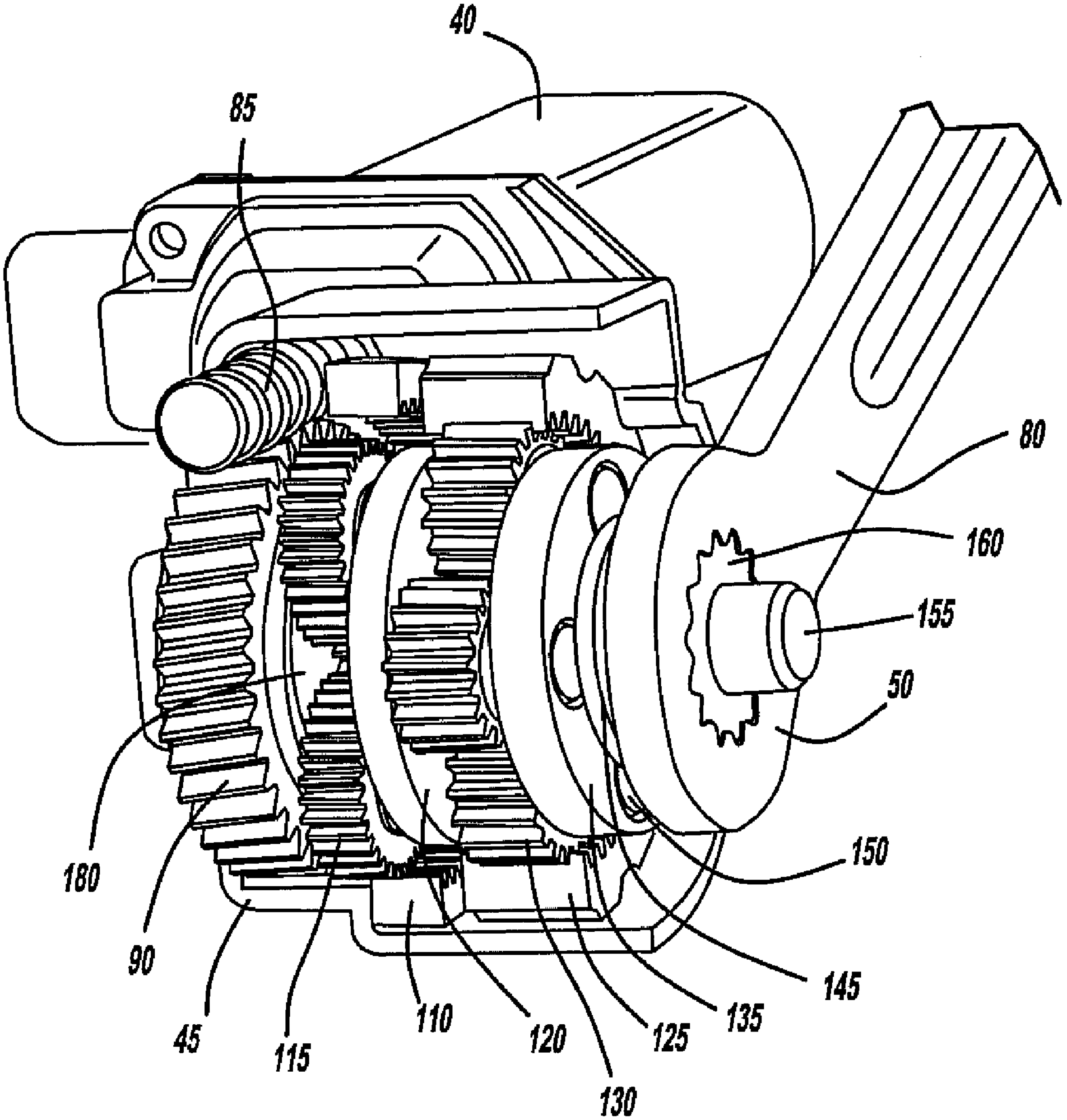
FIG. 2 is a perspective view of a gear train connected to a motor and linkage.

Again referring to the depicted embodiment of FIGS. 1 and 2, the sun gear 90 is meshed with the worm drive 85. The sun gear 90 also includes a pinion 105. A first carrier plate 110 retains a first set of planetary gears 115 that are meshed with the pinion 105 of the sun gear 90. Additionally, a first carrier plate pinion gear 120 is supported by the first carrier plate 110. The second reduction stage 100 includes a second carrier plate 125 and a second set of planetary gears 130 that are meshed with the first carrier plate pinion gear 120. The second carrier plate 125 supports the second set of planetary gears 130 and a second carrier plate pinion gear 135. In one aspect of the invention, the planetary gear train has an output gear ratio of at least 750:1 and preferably greater than 1000:1.

The second carrier plate pinion gear 135 includes a keyed shape 140 formed thereon that is adapted to engage a coupler 145. The coupler 145, as shown in FIG. 1, includes a four lobe keyed design that fits within a slot formed in the second carrier plate pinion gear 135. It should be understood that alternative keyed shapes may be used by the present invention. The coupler 145 also includes a collar 150 formed about a center of the coupler 145 for positioning the coupler 145 axially with respect to the pivot 50. A post 155 extends from the collar and includes a spline 160 that is connected with a compatible shape formed on the pivot 50.

The gear train 45 is disposed within a housing 170 thereby sealing the gear train 45 from the environment. A cover 175 is attached to the housing 170 again sealing the gear train 45 and motor 40. The coupler 145 extends through an opening 178 formed in the cover 175 to slip fit into the spline shape formed on the pivot 50. In one aspect, the housing 170 including the motor 40 and gear train 45 is attached to the body bracket 25 utilizing appropriate fasteners. In this manner, the power trunk closure assembly 10 may be shipped as a complete assembly only requiring attachment of the body bracket 25 and closure member bracket 35 to a vehicle with the addition of providing a power source.

Referring to FIG. 2, in one aspect the gear train 45 may include a clutch 180 positioned between the worm drive 85 and sun gear 90. In one aspect, the clutch 180 is a bidirectional clutch which may be of any suitable design including electromagnetic clutches, roller clutches, sprag clutches, friction clutches and similar designs. The clutch 180 allows for the disengagement of the motor 40 and worm drive 85 from the gear train 45 such that an operator may move the power trunk closure assembly 10 freely when the motor 40 is not powered. It should be realized that the clutch 180 may be positioned anywhere within the planetary gear train after the worm drive 85. In another aspect, the power trunk closure assembly 10 may include no clutch and the worm drive 85 and motor 40 may be designed such that it may be back driven when power is not supplied to the motor 40.

The power trunk closure assembly 10 in one aspect has the motor 40 and gear train 45 attached at the pivot 50 exterior of a trunk. As the term trunk is utilized within this specification, the trunk refers to the cavity formed by the at least one body panel and may include both deck lid and lift gate applications. This arrangement allows for the straightforward attachment of the trunk closure assembly 10 to a vehicle when installing it. The power trunk closure assembly 10 is a self-contained unit that is easy to install and does not require attachment of a second hinge half disposed in a quarter panel of a vehicle, as is commonly done in the art.

Figure 5:
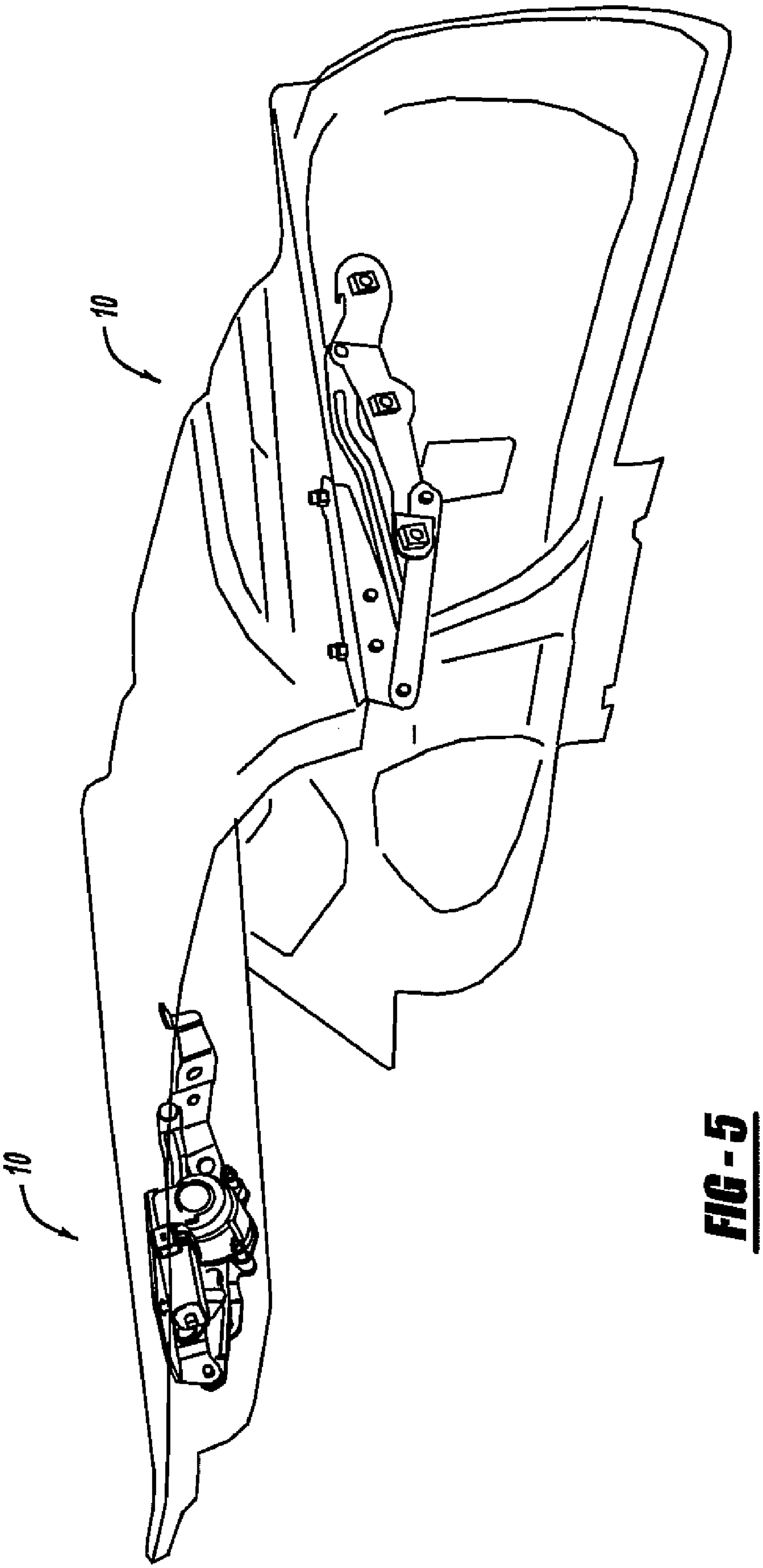
FIG. 5 is a perspective view detailing two power trunk closure assemblies disposed on opposing sides of a trunk opening.

The power trunk closure assembly 10 may be disposed on a single hinge of a multi-hinged trunk closure member 65, as shown in FIG. 5 or may be disposed on multiple hinges of a trunk closure member 65. In one aspect of the invention, both hinge joints may include the power trunk closure assembly 10 or alternatively a single hinge may have the power trunk closure assembly 10 while the other hinge has an alternative hinge.

In another aspect, the power trunk closure assembly 10 may include a switch 179 positioned at the pivot 50 to indicate a position of the closure member 65. It should be realized that the switch 179 may be positioned in alternative locations than the pivot 50. Additionally, the power trunk closure assembly 10 may include an obstacle detection system. Such a system may be linked with the motor 40 to prevent actuation of the motor 40 when something may prevent movement of the closure member 65.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A powered trunk closure assembly for a vehicle comprising:

at least one body panel defining an opening of a trunk, the at least one body panel including a water trough formed thereon;

a closure member positioned about the opening and moveable between open and closed positions relative to the opening;

a linkage assembly having a four bar linkage attached at one end to the body panel and at another end to the closure member;

a motor disposed within the water trough and linked with a gear train, the gear train attached to a pivot of the linkage assembly exterior of the trunk for actuating the linkage assembly, the gear train disposed within the water trough formed in the body panel.

2. The powered trunk closure assembly of claim 1 wherein the gear train is a planetary gear train.

3. The powered trunk closure assembly of claim 1 wherein the gear train has an output gear ratio of at least 750 to 1.

4. The powered trunk closure assembly of claim 2 including a worm drive coupled to the motor.

5. The powered trunk closure assembly of claim 4 wherein the planetary gear train includes at least one reduction stage.

6. The powered trunk closure assembly of claim 5 including first and second reduction stages.

7. The powered trunk closure assembly of claim 6 wherein the first reduction stage includes a worm gear meshed with the worm drive shaft, the worm pear including a sun gear, a first carrier plate and a first set of planetary gears meshed with the sun gear, and a first carrier plate pinion gear supported by the first carrier plate.

8. The powered trunk closure assembly of claim 7 wherein the second reduction stage includes a second carrier plate, a second set of planetary gears meshed with the first carrier plate pinion gear and supported on the second carrier plate and a second carrier plate pinion gear supported by the second carrier plate.

9. The powered trunk closure assembly of claim 7 including a clutch interposed between the sun gear and the worm drive.

10. The powered trunk closure assembly of claim 9 wherein the clutch is a bi-directional clutch.

11. The powered trunk closure assembly of claim 7 including a coupler attached to the second carrier plate pinion gear, the coupler attached to the pivot.

12. The powered trunk closure assembly of claim 11 wherein the coupler includes a keyed shape adapted to slip fit into a corresponding shape formed on the pivot.

13. The powered trunk closure assembly of claim 11 wherein the coupler includes a collar formed about a center of the coupler, the collar positioning the coupler axially with respect to the pivot.

14. The powered trunk closure assembly of claim 1 including a housing disposed about the gear train and a cover attached to the housing.

15. The powered trunk closure assembly of claim 1 wherein the motor is positioned parallel with respect to the linkage assembly.

* * * * *